United States Patent Office 3,144,344
Patented Aug. 11, 1964

3,144,344
MULTIPLE COLOR GLAZES AND PROCESSES
Robert R. Umhoefer, 13348 Debby St., Van Nuys, Calif.
No Drawing. Filed Jan. 12, 1962, Ser. No. 165,950
6 Claims. (Cl. 106—48)

This invention relates to a multiple color effect which facilitates the application of coatings of particles suspended in some medium to absorbent surfaces. It is particularly useful where two or more such coatings are applied by spraying or brushing. The invention as described herein is specifically directed toward improved glaze formulations which are applied to absorbent ceramic bodies. The improvement permits easier application of glazes to a claybody; also more even and uniform application which in general results in a higher quality product.

The term "glaze" is used herein to describe a vitreous or glass-like coating which may range in opacity from clear or transparent to opaque. The expression "glaze components" refers to the essential components of a glaze composition which melt or fuse together when heated to form a vitreous coating. The glaze composition is usually prepared in the form of a suspension of the glaze components in a liquid, usually water. Suspending agents are included in the liquid, as, for example, bentonite and/or carboxymethyl cellulose, to assist in holding the glaze components in a uniform suspension until the coating is formed. Glaze components are usually defined in terms of their oxides and include such oxides as those of sodium, potassium, calcium, boron, lead, aluminum, silicon and zirconium. Some glaze components are prepared in the form of compounds, e.g., zirconium silicate. Most commonly they are prepared by grinding frits to a suitable state of fineness so that they are capable of forming suspensions. Frits are made by smelting the various oxides to a vitreous state and then quenching in water or other suitable liquid.

Heretofore the application of a white or clear appearing unfired glaze suspension to a white claybody, greenware or bisque, has been difficult because of the lack of contrast in color between the two. Also the application of a second or third coat is even more difficult. In the past, this has been partially overcome by adding coloring materials to the glaze. This has been either a soluble dye or color, or an insoluble coloring agent.

Whenever a soluble dye is used, the solvent—water in most cases—is absorbed into the absorbent body which leaves a coating of suspended particles. The dye in this case is carried along with the solvent into the body leaving an essentially colorless coating. After the solvent has been absorbed it is difficult to tell where the glaze has been applied.

Whenever an insoluble color is used, the solvent as before, is absorbed into the body but does not carry the insoluble color with it, thus a colored coating results. The objection to this type of coloring agent is apparent when a second or more coats are required. In this case the even application of a colored glaze to a similarly colored coated body is difficult and the same problems exist as with the original uncolored glaze.

It is the object of this invention to overcome the described deficiencies of the above techniques. It is also an object to produce unfired glaze formulations which change color after application. Such formulations have one color when applied and another different color after solvent absorption or drying. Other objects will appear hereinafter.

This effect is achieved by employing one or more soluble coloring agents or dyes, and one or more insoluble coloring agents or dyes which have a different color. For example, a glaze formulation which contains a suitable amount of soluble yellow dye and a suitable amount of insoluble blue dye or pigment will have a green color. This green color gives a strong contrast to the white ceramic body when first applied. As the solvent is absorbed, the color changes to blue, which also is in sharp contrast to the original green color. Second, and more applications thus may be made without danger of missing areas because the glaze, when applied, has a color which is always different from the previously applied coat.

This invention is best practiced when the soluble color is sufficiently soluble to give good color values and also is not affected or absorbed by the glaze components. The insoluble color may be insoluble per se or may be a soluble color which is rendered insoluble by means of absorption on one or more of the glaze components or by chemical reaction.

Thus, the unfired glaze composition may influence the type of coloring agents used because of absorption or reaction. In general, unfired glazes which contain clay tend to absorb certain soluble colors, and these colors may be used as the insoluble color in these cases. Glazes which contain little or no clay or other absorbents require a solvent-insoluble color for this portion.

It is preferred that both soluble and insoluble colors be wholly organic so that they will burn and be destroyed during the glaze firing, and thus the final glaze is not affected. Where the final glaze can be colored, the coloring agents may contain metals which will result in color formation. Example of this would be a combination of insoluble cobalt blue pigment and a soluble red dye to give a violet color which would dry to a blue and also fire blue, or a blue copper phthalocyanine pigment and a soluble yellow color to give a green mixture which dries blue and fires to a copper green shade.

The following examples, in which the quantities are stated in parts by weight, are intended to illustrate the principle of the invention only, as obviously other coloring agents and concentrations are possible. The glaze formulations can be varied in many ways by those skilled in the art.

*Example 1*

A glaze mixture of the following composition.

| Ingredients: | Parts by weight |
|---|---|
| Ferro Frit No. 3532 | 272 |
| Ferro Frit No. 5301 | 183 |
| EPK clay (Edgar Plastic Kaolin—36.7% $Al_2O_3$, 46.9% $SiO_2$) | 45 |
| Bentonite | 5 |
| Sodium carboxy methyl cellulose (CMC) | 5 |
| Water | 500 |
| Chrysophenine ESP (American Cyanamid) | 0.3 |
| Carmoisine BH Extra Conc. (General Aniline & Film Corporation) | 0.2 |

This mixture was ball milled for one-half hour or until an intimate mixing occurred. The color of this mixture was reddish orange and when brushed on a dry ceramic body, the water slowly soaked into the body and a yellow glaze coating remained. Both of these dyes are soluble in water but the yellow Chrysophenine ESP is rendered insoluble in this glaze mixture.

*Example II*

A clear glaze is made up of the following compositions.

Ingredients: Parts by weight
    Pemco Frit 742 _____ 370
    EPK clay _____ 65
    White lead _____ 60
    Boric acid _____ 5
    Bentonite _____ 5
    CMC _____ 5
    Water _____ 500
    Uranine (Allied Chemical) _____ 0.1
    Sulfanthrene Pink FFS paste (Du Pont) _____ 1.7

This mixture was ball milled to get a uniform mixture which was yellow-orange in color. When brushed onto a dry ceramic body, the water was absorbed slowly and a pink coating remained. The Sulfanthrene Pink FFS is a water insoluble pink dye and the Uranine is water soluble and also is soluble in the glaze mixture.

Using the same base glaze mixture as in Example II, the following color combinations were made up:

*Example III*

Ingredients: Parts by weight
    Glaze mixture (Example II) _____ 1000
    Auramine O Conc. 130% (Allied Chemical) ___ 0.3
    Carmoisine BH Extra Conc. (General Aniline
      & Film Corp.) _____ 0.3

This mixture is a coral color which, when applied to an absorbent surface, dries yellow. Both of these colors are water soluble, but Auramine O Conc. 130% is absorbed and rendered essentially insoluble in this mixture.

*Example IV*

Ingredients: Parts by weight
    Glaze mixture (Example II) _____ 1000
    Brilliant Blue 6G Conc. 150% (Allied Chemical) _____ 0.15
    Carmoisine BH Extra Conc. (General Aniline
      & Film Corp.) _____ 0.4

This mixture is purple in color and dries blue when applied to an absorbent surface. Both of these colors are water soluble but the Brilliant Blue 6G Conc. 150% is rendered essentially insoluble by adsorption in this mixture.

*Example V*

A white glaze mixture was made up of the following.

Ingredients: Parts by weight
    Glostex Frit BR-12 _____ 250
    Glostex Frit HP-33 _____ 125
    EPK clay _____ 50
    Superpax (zirconium silicate; 62.2% ZiO$_2$,
      36.6% SiO$_2$) _____ 75
    Bentonite _____ 5
    CMC _____ 5
    Water _____ 500
    Uranine (Allied Chemical) _____ 0.1
    Caccomine Sky Blue (American Cynamid) ____ 0.3

This mixture had a bright green color when brushed onto a dry ceramic body. The water was absorbed slowly and a blue coating remained. Both these colors are water soluble but in this glaze mixture the Caccomine Sky Blue is adsorbed and becomes essentially insoluble.

In the foregoing examples, the Pemco Pb742 has the following composition in terms of percent by weight of the oxides:

Na$_2$O _____ 3.77
CaO _____ 4.77
PbO _____ 30.85
Al$_2$O$_3$ _____ 3.39
B$_2$O$_3$ _____ 12.72
SiO$_2$ _____ 43.64
ZrO$_2$ _____ 1.15

The Glostex HP-33 has the following composition in terms of percent by weight of the oxides:

Na$_2$O _____ 6.5
PbO _____ 59.2
B$_2$O$_3$ _____ 14.5
SiO$_2$ _____ 19.8

The compositions for Ferro 3532, Ferro 5301 and Glostex BR-12 are not available.

The glazes are usually formulated so that they can be fired at specific temperature ranges. Those given in the examples are intended for use at cone 06 (1005° C.) with a range of cone 07 to cone 05 (975° C.–1030° C.).

It will be understood that the compositions can be varied for different firing temperature ranges and a great number of glaze components can be used. The invention is not limited to any particular glaze formulation or concentration of glaze compositions. However, in most cases the glaze components will constitute 30% to 70% by weight of the glaze composition. Where an absorbent constituent is used, for example, clay, to render insoluble a water soluble dye, it is usually preferable to have a maximum content of such absorbent of about 10% by weight of the suspension. In general, the more absorbent used, the more the color that can be absorbed and hence the strength of the dried color may be dependent upon the absorbent content. Where such an absorbent is used a minimum of at least 1% absorbent by weight of the suspension is usually desirable. Colloidal suspending agents normally constitute 0.5% to 5.0% by weight of the suspension. Total coloring agents normally constitute 0.01% to 0.25% by weight of the suspension.

The quantity of the liquid suspending agent, such as water or other liquid suspending agent, is preferably around 50% by weight of the suspension but can be varied, for example, within a range of 30% to 70% by weight of the suspension. The glaze compositions are usually sold in wet form but can also be prepared in the form of a dry mixture so that the water or other liquid suspending agent can be added later.

The coloring compositions for addition to glaze mixtures can also be separately prepared and are usually added to the glaze mixture suspended in water in very small amounts corresponding to a fraction of a percent by weight of the suspension. Examples of preferred combinations of coloring agents and proportions thereof based on the weight of the suspensions are as follows:

|     |     | Percent |
| --- | --- | --- |
| (a) | Chrysophenine ESP | 0.01–0.1 |
|     | Carmoisine BH Extra Conc | 0.01–0.05 |
| (b) | Auramine O Conc. 130% | 0.01–0.1 |
|     | Carmoisine BH Extra Conc | 0.01–0.05 |
| (c) | Brilliant Blue 6G Conc. 150% | 0.005–0.02 |
|     | Carmoisine BH Extra Conc | 0.01–0.05 |
| (d) | Uranine | 0.005–0.05 |
|     | Caccomine Sky Blue | 0.01–0.05 |
| (e) | Uranine | 0.005–0.05 |
|     | Sulfanthrene Pink FFS paste | 0.05–0.25 |

The porous bodies to which the coatings are applied may be any material commonly used by the ceramic industry, such as a clay body, or prepared mixed bodies of clay and talc or alumina bodies. These may contain minor to major amounts of other materials depending on the use and firing temperature. The invention is applicable to any porous solids capable of withstanding the firing temperature of the glaze.

The coloring agents previously described all can be identified from Color Index, 2nd Edition 1956, as follows:

| Coloring Agent | Other Name | Color Index Number |
|---|---|---|
| Chrysophenine ESP | Direct Yellow No. 12 | 24895 |
| Caccomine Sky Blue | Direct Blue No. 1 | 24410 |
| Carmoisine BH Extra Conc | Acid Red No. 14 | 14720 |
| Uranine Conc | Acid Yellow No. 73 | 45350 |
| Auramine O Conc. 130% | Basic Yellow No. 2 | 41000 |
| Brilliant Blue 6G Conc. 150% | Basic Blue No. 1 | 42025 |
| Sulfanthrene Pink FFS Paste | Vat Red No. 1 | 73360 |

The invention is hereby claimed as follows:

1. A glaze coating process of applying a vitreous glaze to a porous ceramic solid capable of withstanding the firing temperature of the glaze which comprises coating said solid with a liquid suspension of glaze components containing at least two coloring agents of different and contrasting colors, one of said coloring agents being soluble in said liquid and being absorbed by the porous solid and another said coloring agent being insoluble in said liquid and remaining on the surface of the said solid, thus effecting a color change on the surface.

2. A process as claimed in claim 1 in which said coated porous solid is fired and said coloring agents are destroyed when said porous solid is fired.

3. A process as claimed in claim 1 in which said coated porous solid is fired and the insoluble coloring agent is a permanent coloring agent which colors the glaze before and after it is fired.

4. A process of applying a vitreous glaze to a porous ceramic solid capable of withstanding the firing temperature of the vitreous glaze which comprises coating said solid with a liquid suspension of vitreous glaze components containing at least two coloring agents of different and contrasting colors, one of which is soluble in said liquid and is absorbed by said porous solid and another of which is insoluble in said liquid and is not appreciably absorbed by said solid, the wet glaze coating exhibiting a predetermined color immediately after it has been applied which is different and contrasting from that of said solid and the dried glaze coating exhibiting a different predetermined contrasting color from the color of the wet glaze coating and from the color of the solid, drying said wet coating, applying a second coating of said liquid suspension over said dried coating, drying said second coating, and firing the coated solid.

5. A process as claimed in claim 4 in which additional wet coatings of said liquid suspension of glaze components are successively applied and dried before firing.

6. A glaze composition comprising a suspension in a liquid of vitreous glaze components which form a vitreous coating when applied to a ceramic solid absorbent surface and fired, said suspension also containing a colloidal suspending agent and at least two different and contrasting coloring agents, one of said coloring agents being dissolved in said liquid and another of said coloring agents being undissolved in said liquid and remaining on the surface of said ceramic solid absorbent surface, thus effecting a color change on said surface.

References Cited in the file of this patent

UNITED STATES PATENTS

| | | |
|---|---|---|
| 1,863,813 | Alden et al. | June 21, 1932 |
| 2,103,228 | Kreidl | Dec. 21, 1937 |
| 2,113,625 | Monteith | Apr. 12, 1938 |
| 2,220,341 | Madison et al. | Nov. 5, 1940 |
| 2,267,928 | Kreidl | Dec. 30, 1941 |
| 2,305,313 | Kreidl | Dec. 15, 1942 |
| 2,317,436 | Boller et al. | Apr. 27, 1943 |
| 3,047,418 | Compton | July 31, 1962 |